(12) United States Patent
Fang et al.

(10) Patent No.: US 9,432,660 B2
(45) Date of Patent: Aug. 30, 2016

(54) DISPLAY DEVICE

(71) Applicant: SHENZHEN CHINA STAR OPTOELECTRONICS TECHNOLOGY CO., LTD., Shenzhen, Guangdong (CN)

(72) Inventors: Bin Fang, Shenzhen (CN); Jianhong Chen, Shenzhen (CN); Zhiming Yang, Shenzhen (CN)

(73) Assignee: SHENZHEN CHINA STAR OPTOELECTRONICS TECHNOLOGY CO., LTD., SHENZHEN (CN)

( * ) Notice: Subject to any disclaimer, the term of this patent is extended or adjusted under 35 U.S.C. 154(b) by 227 days.

(21) Appl. No.: 14/238,734

(22) PCT Filed: Dec. 31, 2013

(86) PCT No.: PCT/CN2013/091087
§ 371 (c)(1),
(2) Date: Feb. 12, 2014

(87) PCT Pub. No.: WO2015/089883
PCT Pub. Date: Jun. 25, 2015

(65) Prior Publication Data
US 2015/0350633 A1 Dec. 3, 2015

(30) Foreign Application Priority Data
Dec. 19, 2013 (CN) .......................... 2013 1 07033266

(51) Int. Cl.
*G02F 1/1335* (2006.01)
*H04N 13/04* (2006.01)
*G02F 1/1347* (2006.01)
(Continued)

(52) U.S. Cl.
CPC ...... *H04N 13/0454* (2013.01); *G02B 27/2214* (2013.01); *G02B 27/26* (2013.01); *G02F 1/1347* (2013.01); *G02F 1/13362* (2013.01); *G02F 1/133528* (2013.01); *H04N 13/0434* (2013.01); *G02F 2001/133531* (2013.01)

(58) Field of Classification Search
CPC ..................... G02F 1/133528; G02F 1/13362; G02F 1/1347; H04N 13/0434; H04N 13/0454; G02B 27/26
See application file for complete search history.

(56) References Cited

U.S. PATENT DOCUMENTS

| 7,557,871 B2 * | 7/2009 | Matsumoto .......... | G02B 5/3083 349/117 |
| 7,868,952 B2 * | 1/2011 | Fukushima ........ | G02B 27/2214 349/15 |

(Continued)

*Primary Examiner* — James Dudek

(57) ABSTRACT

The present invention relates to a display device, which comprises a first polarizing plate and a second polarizing plate; the polarization direction of the first polarizing plate and the polarization direction of the second polarizing plate perpendicular to each other; a liquid crystal layer deposited between the first polarizing plate and the second polarizing plate and configured to display images; a polarization control layer laminated onto the second polarizing plate and configured to control the optical path difference; and a third polarizing plate laminated onto the polarization control layer; the third polarizing plate comprises unpolarized regions arranged in an array. By applying voltage to the polarization control layer, the polarization direction of the light is also changed; in this way, the third polarizing plate can act as a grating or a common light-transmitting plate, and the switch between 2D display mode and 3D display mode can be achieved.

5 Claims, 5 Drawing Sheets

(51) Int. Cl.
*G02B 27/26* (2006.01)
*G02B 27/22* (2006.01)

(56) References Cited

U.S. PATENT DOCUMENTS

2009/0066864 A1\* 3/2009 Koyama ............ G02B 27/2214
349/15

2012/0235948 A1\* 9/2012 Inoue ................... G02F 1/13338
345/173
2013/0250195 A1\* 9/2013 Koito .................... G02F 1/1313
349/15
2013/0299082 A1\* 11/2013 Yamazaki ............. G02F 1/1333
156/275.5
2013/0321723 A1\* 12/2013 Ishiguro ................ G02B 27/26
349/15

\* cited by examiner

DISPLAY DEVICE

TECHNICAL FIELD

The present invention relates to three-dimensional (3D) display technology, and more particularly, relates to a display device which can switch between two-dimensional (2D) display mode and 3D display mode.

BACKGROUND

With the development of the display technology, a display device with the function of 3D display is more and more popular in the market. The 3D display technology in the prior art can be classified into naked-eye display and glasses display; wherein the naked-eye display has caused extensive concern since it can obtain the 3D display effect without wearing extra apparatus.

The collecting process and displaying process in the naked-eye 3D display in the prior art are as shown in FIGS. 1 and 2. A solid-state grating baffle plate 200 is deposited between an object to be collected 101 and an imaging sensor 300. In this way, the light emitted by the object to be collected 101 passes through the pinhole array on the solid-state grating baffle plate 200 and then projects on the imaging sensor 300, an elemental image array is thus formed. However, during the displaying process, the elemental image array is displayed on the display device, such as a LCD display; and a solid-state grating baffle plate 200 same as that one in the collecting process is also deposited in front of the elemental image array. In this way, since the light is reversible, two images respectively received by the left eye 102 and the right eye 103 of human can be reconstructed, and the naked-eye 3D display thereby can be achieved.

However, the display device with the configuration of this type can only display 3D images, and can not be used to watch 2D images, which is not only bad for the promotion and invention of the 3D display technology, but also inconvenient for the user.

BRIEF SUMMARY

To overcome the drawbacks that the 3D display device can not display 2D images directly in the prior art; the objective of the present invention is to provide a display device which can switch between 2D display mode and 3D display mode.

In accordance with one aspect of the present invention, a display device is provided, which comprises:

a first polarizing plate and a second polarizing plate; the polarization direction of the first polarizing plate and the polarization direction of the second polarizing plate perpendicular to each other;

a liquid crystal layer deposited between the first polarizing plate and the second polarizing plate and configured to display images;

a polarization control layer laminated onto the second polarizing plate and configured to control the optical path difference; and a third polarizing plate laminated onto the polarization control layer; the third polarizing plate comprises unpolarized regions arranged in an array.

In one embodiment, the unpolarized regions include circular holes, rectangular holes, triangular holes or hexagonal holes arranged in an array.

In another embodiment, the unpolarized regions include strip-shaped grooves arranged in interval.

In a further embodiment, the display device further includes a backlight assembly which has the first polarizing plate laminated onto and is configured to provide backlight.

In one embodiment, the optical path difference of the polarization control layer is between 0 to $\lambda/2$, wherein $\lambda$ is the wavelength of the light exited from the liquid crystal layer.

In another further embodiment, the polarization control layer is an electrically controlled liquid crystal layer, which comprises at least one from the following: TN (the twisted nematic), STN (the super twisted nematic), OCB (the optically compensated bend) or VA (the vertical alignment).

In one embodiment, the polarization direction of the third polarizing plate is the same as the polarization direction of the first polarizing plate or the polarization direction of the second polarizing plate.

In accordance with another aspect of the present invention, a display device is provided, which comprises:

a first polarizing plate and a second polarizing plate; the polarization direction of the first polarizing plate and the polarization direction of the second polarizing plate perpendicular to each other; and a liquid crystal layer configured to display images, a polarization control layer configured to control the optical path difference, and a third polarizing plate deposited between the first polarizing plate and the second polarizing plate successively;

the third polarizing plate comprising unpolarized regions arranged in an array.

In one embodiment, the unpolarized regions include circular holes, rectangular holes, triangular holes or hexagonal holes arranged in an array.

In another embodiment, the unpolarized regions include strip-shaped grooves arranged in interval.

In a further embodiment, the display device further includes a backlight assembly which has the first polarizing plate laminated onto and is configured to provide backlight.

In one embodiment, the optical path difference of the polarization control layer is between 0 to $\lambda/2$, wherein $\lambda$ is the wavelength of the light exited from the liquid crystal layer.

In another further embodiment, the polarization control layer is an electrically controlled liquid crystal layer, which comprises at least one from the following: TN (the twisted nematic), STN (the super twisted nematic), OCB (the optically compensated bend) or VA (the vertical alignment).

In one embodiment, the polarization direction of the third polarizing plate is the same as the polarization direction of the first polarizing plate or the polarization direction of the second polarizing plate.

When implementing the display device of the present invention, the following advantageous effects can be achieved: by applying voltage to the polarization control layer, the optical path difference of the polarization control layer is changed, and then the polarization direction of the light is also changed; in this way, the third polarizing plate can act as a grating or a common light-transmitting plate, and the switch between 2D display mode and 3D display mode can be achieved; user can see 2D images and 3D images on one display device, which makes the display device convenient to use.

BRIEF DESCRIPTION OF THE DRAWINGS

The present invention will be further described with reference to the accompanying drawings in the following, in the accompanying drawings.

DETAILED DESCRIPTION OF THE PREFERRED EMBODIMENT

The present invention will now be described in detail with reference to the accompanying drawings and embodiments.

Figure 1:
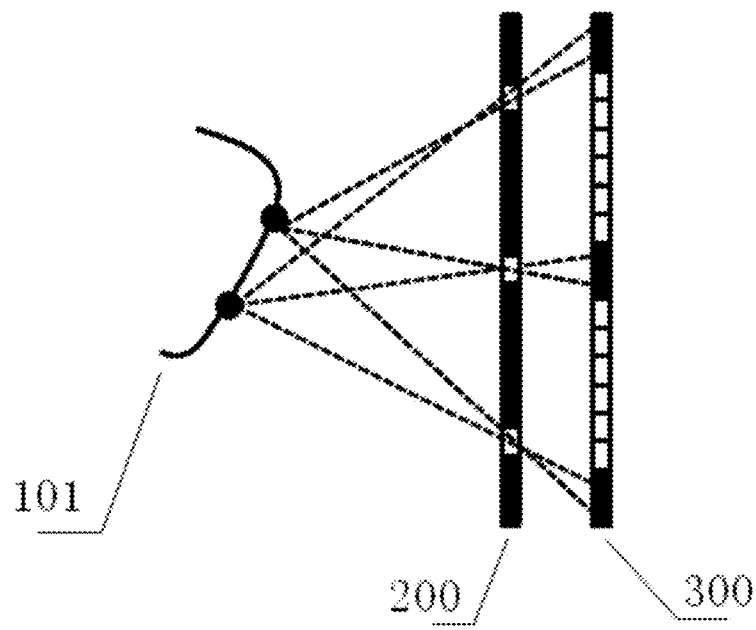
FIG. 1 is a schematic diagram of the collecting process of the naked-eye 3D image in the prior art.
Figure 2:
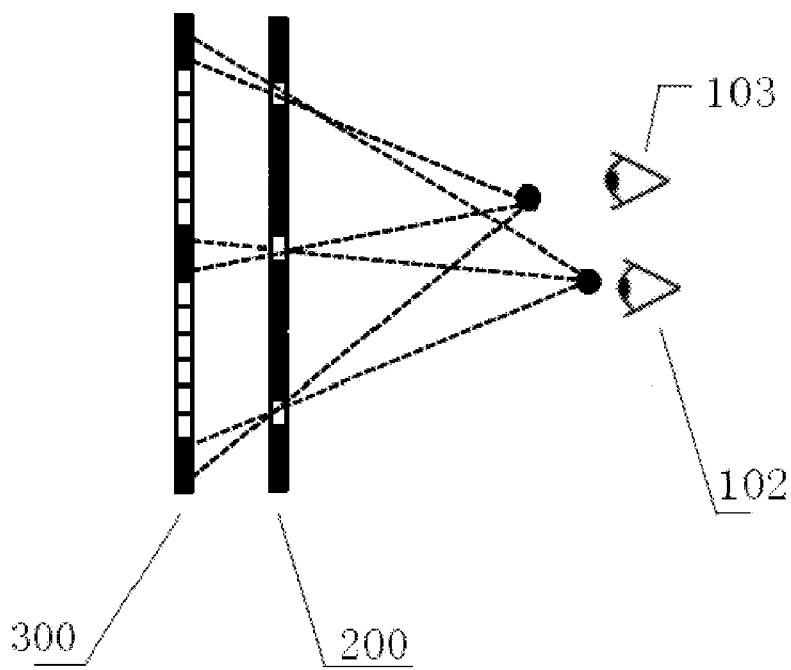
FIG. 2 is an schematic diagram of the displaying process of the naked-eye 3D image in the prior art.
Figure 3:
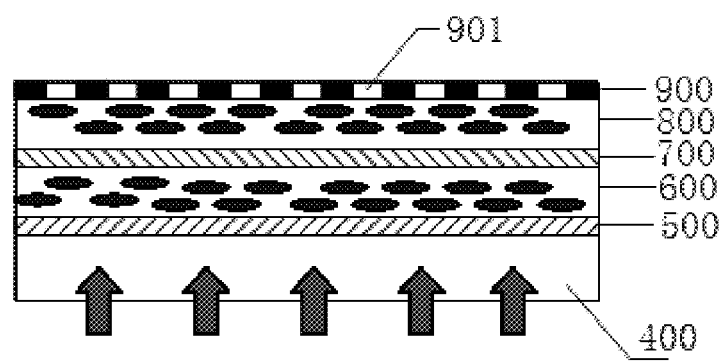
FIG. 3 is a side view of a display device according to a first embodiment of the present invention.

For the purpose of overcoming the drawbacks that a display device can only display 3D images, and can not be adapted to 2D and 3D images in the prior art shown in FIGS. 1-2, a first embodiment of a display device as shown in FIG. 3 is provided in the present invention. In this embodiment, the display device comprises a plurality of components laminated successively: a backlight assembly 400 configured to provide a backlight source needed for the work of display device; a first polarizing plate 500 such as an array plate laminated onto the backlight assembly 400 to make the light emitted from the backlight assembly 400 form a linearly polarized light; a liquid crystal layer 600 configured to display images, in this embodiment, the liquid crystal layer 600 can display common 2D images as well as elemental image array for the 3D display; and a second polarizing plate 700 such as color filter (CF), wherein the polarization direction of the first polarizing plate 500 is perpendicular to the polarization direction of the second polarizing plate 700. In this way, the display device has configuration the same as the typical configuration of a liquid crystal display, and can display the common 2D images. Based on this, a polarization control layer 800 and a third polarizing plate 900 are laminated on the second polarizing plate 700 successively, which forms the display device provided in this embodiment.

In this embodiment, the polarization control layer 800 is an electrically controlled liquid crystal layer, and is filled with liquid crystals; the molecular arrangement of which can be changed with the change of voltage or current. The liquid crystals can be those of the types such as TN, STN, OCB, VA or the like, or the composite of those liquid crystals, as long as the liquid crystals can produce a optical path difference which is between 0 to $\lambda/2$ ($\lambda$ is the wavelength of the light emitted) on the lights exited from the second polarizing plate 700 with the function of the external voltage/current. In particular, if the optical path difference is 0 under the function of the external voltage/current, the polarization direction of the light exited from the second polarizing plate 700 keeps unchanged; and if the optical path difference is adjusted to $\lambda/2$, the polarization direction of the light exited from the second polarizing plate 700 is rotated by 90°.

Unpolarized regions 901 arranged in an array are positioned on the third polarizing plate 900. For example, the unpolarized regions arranged in an array are formed by defining a plurality of through-holes arranged in an array on a polarizing plate, or by depolarizing the predetermined positions on a whole polarizing plate. In addition, it can be also possible that the unpolarized regions are a grating which is the solid-state grating 200 shown in FIGS. 1-2 with extra polarization transmission treatment. There are a number of deposition methods for polarization direction of third polarizing plate 900, and the best deposition method is that the polarization direction of the third polarizing plate 900 is the same as the polarization direction of the first polarizing plate 500, or the same as the polarization direction of the second polarizing plate 700. When the polarization direction the third polarizing plate 900 is the same as the polarization direction of the first polarizing plate 500 or the same as the polarization direction of the second polarizing plate 700, the optical path difference of the polarization control layer 800 may switch between 0 and $\lambda/2$.

Figure 4:
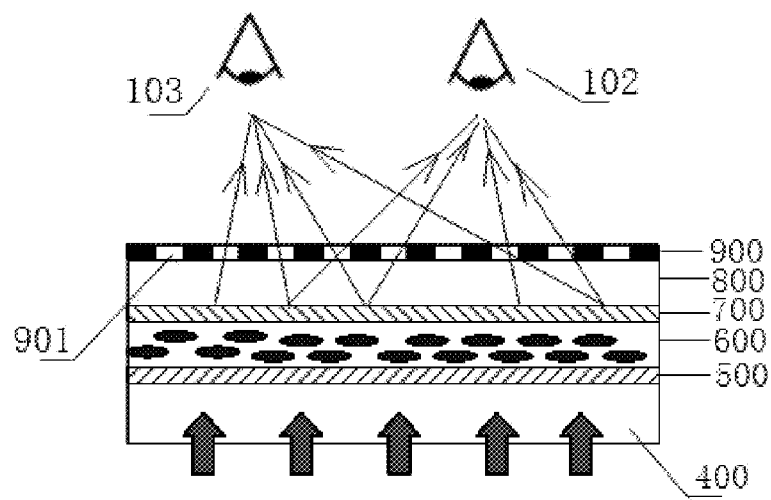
FIG. 4 is a schematic diagram that illustrates the displaying process of a 3D image using the display device according to the first embodiment of the present invention.
Figure 5:
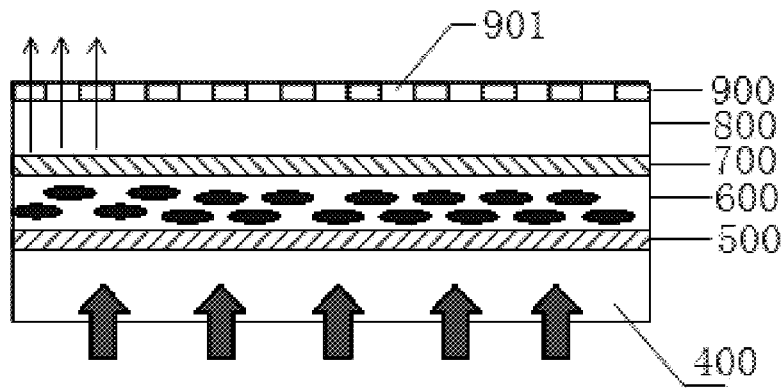
FIG. 5 is a schematic diagram that illustrates the displaying process of a 2D image using the display device according to the first embodiment of the present invention.

The switch between 2D images display and 3D images display according to the first embodiment of the present invention will further be described in detail accompanying with FIGS. 4-5.

As shown in FIG. 4, the polarization angles of the first polarizing plate 500 and the second polarizing plate 700 respectively are 0° and 90°, and the polarization angle of the third polarizing plate 900 is 90°. That is, the polarization direction of the third polarizing plate 900 is the same as the polarization direction of the second polarizing plate 700. By controlling the voltage/current, the optical path difference of the polarization control layer 800 is switched to $\lambda/2$. Since the polarization direction of the light passing the polarization control layer 800 may be rotated by 90°, the light exited from the second polarizing plate 700 can only be exited from the unpolarized regions 901. At this time, if the liquid crystal layer 600 displays the elemental image array, the light passing the third polarizing plate 900 may form left images and right images, which are received by the left eye 102 and the right eye 103 respectively, and thus the 3D images can be formed. This imaging process is similar to the imaging process shown in FIG. 2.

If the optical path difference of the polarization control layer 800 shown in FIG. 4 is switched to 0 under the control of the voltage/current, the light emerging effect can be as shown in FIG. 5. The whole third polarizing plate 900 will be light transmitting to the second polarizing plate 700, since the polarization direction of the third polarizing plate 900 is the same as the polarization direction of the second polarizing plate 700, as well as the polarization control layer 800 with the optical path difference switched to 0 brings no changes to the polarization direction of the light. At this time, the liquid crystal layer 600 displays common 2D images.

If the polarization direction of the third polarizing plate 900 shown in FIGS. 4-5 is switched to 0°, the optical path differences of the polarization control layer 800 in 2D display mode and 3D display mode may be opposite to those shown in FIGS. 4 and 5; that is, in 2D display mode, the optical path difference of the polarization control layer 800 should be switched to λ/2, while in 3D display mode, the optical path difference of the polarization control layer 800 should be switched to 0.

Therefore, it can be seen that, the third polarizing plate 900 may be switched between the grating and the light transmitting plate with respect to the second polarizing plate 700 by adjusting the optical path difference of the polarization control layer 800; and the switch between the 3D images display and the 2D images display can be achieved.

Figure 6:
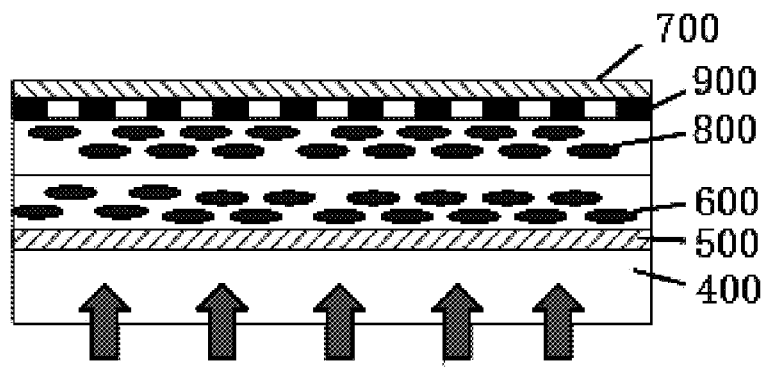
FIG. 6 is a side view of a display device according to a second embodiment of the present invention.

In the embodiment shown in FIG. 3, as a result that the third polarizing plate 900 is deposited on the outermost side, when displaying 2D images, there is a risk that abnormal conditions may likely occur, which includes a brightness non-uniformity (mura) or spots appearing in the unpolarized regions 901. To overcome this defect, a second embodiment as shown in FIG. 6 is provided in the present invention. In this embodiment, a display device comprises a plurality of layers laminated successively from the bottom to the top: a backlight assembly 400 configured to provide a backlight source needed for the work of the display device; a first polarizing plate 500 and a liquid crystal layer 600 laminated onto the backlight assembly 400; a polarization control layer 800 laminated directly onto the liquid crystal layer 600; and a third polarizing plate 900 and a second polarizing plate 700 laminated onto the polarization control layer 800. That is, compared with the first embodiment, the second polarizing plate 700 is no longer deposited between the liquid crystal layer 600 and the polarization control layer 800; it is deposited onto the top in this case.

Figure 7:
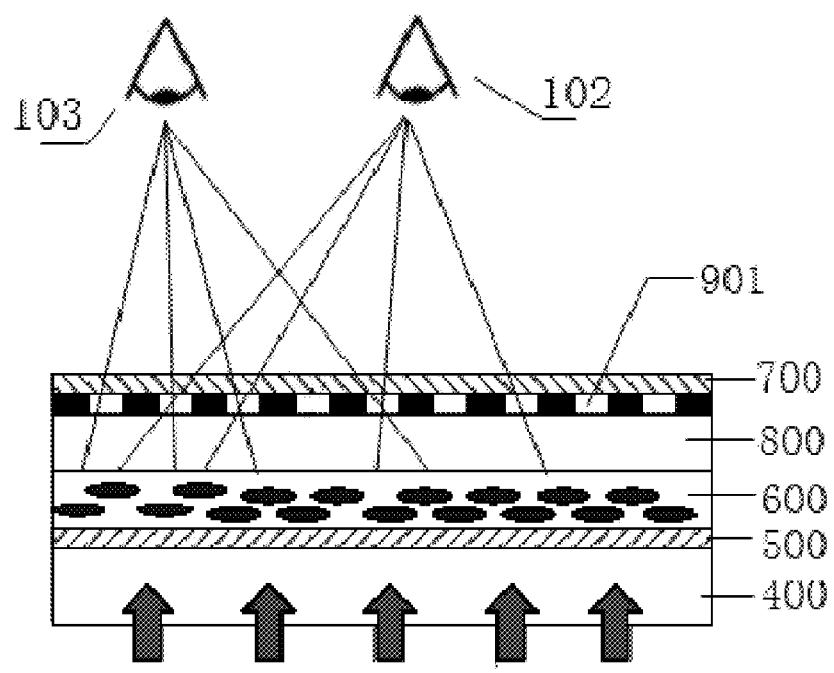
FIG. 7 is a schematic diagram that illustrates the displaying process of a 3D image using the display device according to the second embodiment of the present invention.

When using the display device according to the second embodiment to display 3D images, the displaying effect is shown in FIG. 7. The light configured for backlight display is emitted from backlight assembly 400, polarized by the first polarizing plate 500 and incident into the liquid crystal display layer 600. In the 3D display mode, the liquid crystal display layer 600 displays elemental image array; and the light exited from the liquid crystal display layer 600 is incident into the polarization control layer 800. After the adjustment of the optical path in the polarization control layer 800, and before the light reaches to the third polarizing plate 900, the polarization direction is adjusted to be perpendicular to the polarization direction of the third polarizing plate 900. In this way, the light can be only exited from the unpolarized regions 901 of the third polarizing plate 900, and forms the left images and right images after the distribution by the second polarizing plate 700, and the left images and right images are respectively received by the left eye 102 and the right eye 103, in such a way, a 3D image is formed.

When using the display device according to this embodiment to display 3D images, the polarization direction of each polarizing plate is set as follow: the polarization angle of the first polarizing plate 500 is 0°, the polarization angle of the second polarizing plate 700 is 90°; and the polarization angle of the third polarizing plate 900 has two choices, 0° or 90°. If the polarization angle of the third polarizing plate 900 is 0°, the optical path difference of the polarization control layer 800 is adjusted to λ/2, and the polarization direction of the light is rotated by 90° with the optical path difference. At this moment, the polarization direction of the light is perpendicular to the polarization direction of the third polarizing plate 900, and the light can be only exited from the unpolarized regions 901. If the polarization direction of the third polarizing plate 900 is 90°, the optical path difference of the polarization control layer 800 is adjusted to 0, and the polarization direction of the light will not be changed when the light passes the polarization control layer 800. Therefore, the polarization direction of the light is 90° relative to the polarization direction of the third polarizing plate 900 before the light reaches to the third polarizing plate 900, and thus the light can only be exited from the unpolarized regions 901.

Figure 8:
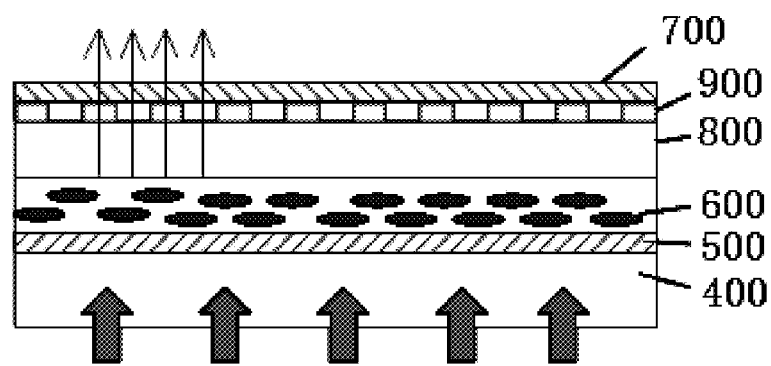
FIG. 8 is a schematic diagram that illustrates the displaying process of a 2D image using the display device according to the second embodiment of the present invention.

When using the display device according to the second embodiment to display 2D images, the display effect is as shown in FIG. 8. The light configured for the backlight display is emitted from the backlight assembly 400, polarized by the first polarizing plate 500 and then incident into the liquid crystal layer 600. In the 2D display mode, the liquid crystal layer 600 displays common 2D images. The light exited from the liquid crystal layer 600 is incident into the polarization control layer 800. After the adjustment of the optical path in the polarization control layer 800, and before the light reaches to the third polarizing plate 900, the polarization direction of the light is adjusted to be the same as the polarization direction of the third polarizing plate 900, the light can be exited from the whole third polarizing plate 900. Then after the distribution by the second polarizing plate 700, 2D images are formed. Even though a brightness mura is occurred on the unpolarized regions 901 of the third polarizing plate 900, an effective controlled can be achieved by the second polarizing plate 700 on the outmost side, since the distribution by the second polarizing plate 700 is set on the top of the third polarizing plate 900.

When using the display device according to this embodiment to display 2D images, the polarization direction of each polarizing plate is set as follow: the polarization angle of the first polarizing plate 500 is 0°, the polarization angle of the second polarizing plate 700 is 90°; and the polarization angle of the third polarizing plate 900 has two choices, 0° or 90°. If the polarization angle of the third polarizing plate 900 is 0°, the optical path difference of the polarization control layer 800 is adjusted to 0, and the polarization direction of the light will not be changed with this optical path difference. At this moment, the polarization direction of the light is the same as the polarization direction of the third polarizing plate 900, and the light can be exited from the whole third polarizing plate 900. If the polarization direction of the third polarizing plate 900 is 90°, the optical path difference of the polarization control layer 800 is adjusted to λ/2, and the polarization direction of the light is rotated by 90° when passing the polarization control layer 800. Therefore, the polarization direction of the light is the same as the polarization direction of the third polarizing plate 900 before the light reaches to the third polarizing plate 900, and the light can be exited from the whole third polarizing plate 900.

It can be seen from the switch between the 2D and 3D display according to the two embodiments aforesaid that, when using the display device according to this invention to display 2D images, the third polarizing plate 900 and polarization control layer 800 should be set to make the polarization direction of the light exited from the polarization control layer 800 the same as the polarization direction of the third polarizing plate 900 when the light reaching to the third polarizing plate 900. However, when displaying 3D images, the third polarizing plate 900 and the polarization control layer 800 should be set to make the polarization direction of the light exited from the polarization control layer 800 perpendicular to the polarization direction of the third polarizing plate 900 before the light reaches to the third polarizing plate 900, in this way, the light can only be exited from the unpolarized regions 901 of the third polarizing plate 900.

In each embodiment above, the polarization direction of the third polarizing plate 900 is set to be the same as the polarization direction of the first polarizing plate 500 or the polarization direction of the second polarizing plate 700. However, the polarization direction of the third polarizing plate 900 can be set in any ways, as long as by adjusting the optical path difference of the polarization control layer 800, the polarization direction of the light reached to incident surface of the third polarizing plate 900 is the same as the polarization direction of the third polarizing plate 900 when displaying 2D images; and the polarization direction of the light reaching to incident surface of the third polarizing plate 900 is perpendicular to the polarization direction of the third polarizing plate 900 when displaying 3D images.

Figure 9:
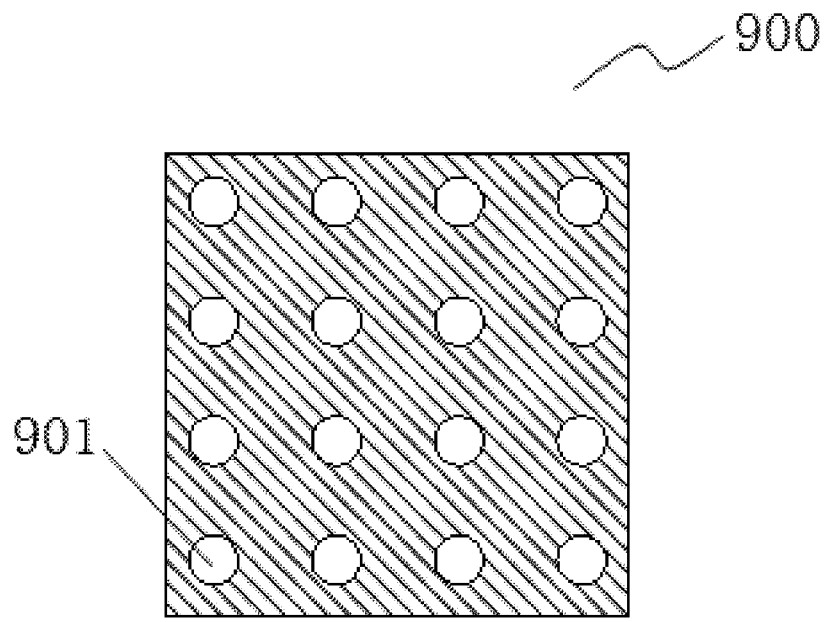
FIG. 9 is a front view of the first embodiment of the third polarizing plate of the present invention.
Figure 10:
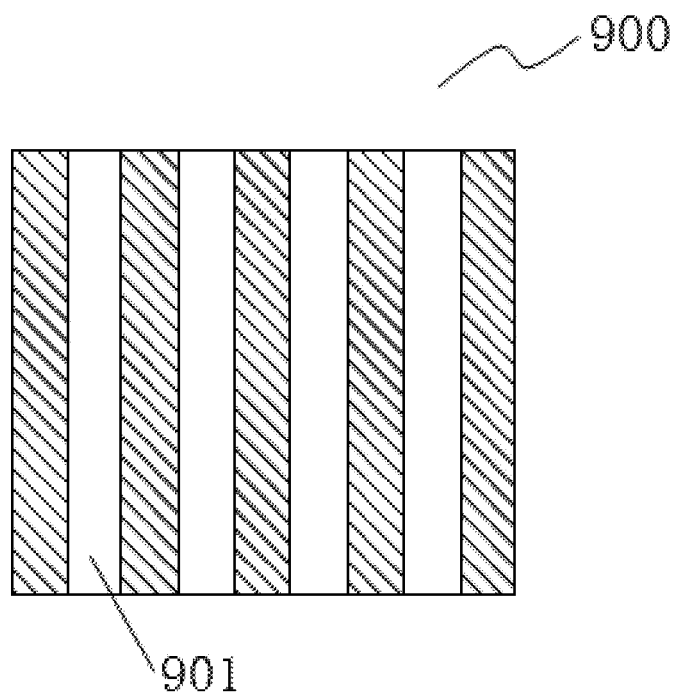
FIG. 10 is a front view of the second embodiment of the third polarizing plate of the present invention.

In the two embodiments above, the unpolarized regions 901 of the third polarizing plate 900 includes unpolarized holes arranged in an array, as shown in FIG. 9. Circular holes of the same dimension can be defined in an array on the third polarizing plate 900 shown in FIG. 9. There are no polarization orientations on the circular holes, and thus the light with any polarization orientation can pass through the hole. It should be understood for one skilled in the art that, in addition to the circular holes, unpolarized holes in other shapes such as triangle, rectangle or hexagon are also possible. In addition to the unpolarized regions with holes arranged in an array, the unpolarized regions in this invention can have other forms of configurations, so that the elemental image array reproduces the images which are received respectively by the left eye and the right eye in 3D display mode. FIG. 10 shows anther implemental mode of the unpolarized regions. The unpolarized regions 901 may include strip-shaped grooves arranged in interval. The distances between every two adjacent strip-shaped grooves are the same. The strip-shaped grooves can be arranged in a certain angle relative to the edge of the plane, or the strip-shaped grooves can be arranged parallel to the edge of the plane as required. For example, in FIG. 10, the strip-shaped grooves extend in the longitudinal direction, and are parallel to the left and right edges of the plane.

It should be point out that, the unpolarized holes in an array and the linear grooves in interval just show two achievable modes of the third polarizing plate of the present invention; one skilled in the art may reproduces the images received by the left eye and the right eye respectively from the elemental images by adopting the third polarizing plate with other configurations, which belongs to the protecting scope of the present invention.

Those mentioned above are the detailed descriptions of the embodiments. However, the present invention is not limited to the above embodiments. Various changes may be made and equivalents may be substituted without departing from the scope of the present invention. All the changes will be included within the scope of the appended claims.

The invention claimed is:

1. A display device, comprising:
a first polarizing plate and a second polarizing plate; the polarization direction of the first polarizing plate and the polarization direction of the second polarizing plate perpendicular to each other; and
a liquid crystal layer configured to display images, a polarization control layer configured to control the optical path difference, and a third polarizing plate deposited between the first polarizing plate and the second polarizing plate successively;
the third polarizing plate comprising unpolarized regions arranged in an array;
wherein the display device further includes a backlight assembly which has the first polarizing plate laminated onto and is configured to provide backlight; the optical path difference of the polarization control layer is between 0 to $\lambda/2$, wherein $\lambda$, is the wavelength of the light exited from the liquid crystal layer;
wherein the second polarizing plate is deposited onto the top, the polarization control layer is laminated directly onto the liquid crystal layer, the third polarizing plate and the second polarizing plate are laminated onto the polarization control layer, the third polarizing plate is laminated directly onto the polarization control layer.

2. The display device according to claim 1, wherein the polarization control layer is an electrically controlled liquid crystal layer, which comprises at least one from the following: the twisted nematic, the super twisted nematic, the optically compensated bend or the vertical alignment.

3. The display device according to claim 1, wherein the polarization direction of the third polarizing plate is the same as the polarization direction of the first polarizing plate or the polarization direction of the second polarizing plate.

4. The display device according to claim 1, wherein the unpolarized regions include circular holes, rectangular holes, triangular holes or hexagonal holes arranged in an array.

5. The display device according to claim 1, wherein the unpolarized regions include strip-shaped grooves arranged in interval.

* * * * *